United States Patent Office 3,485,593
Patented Dec. 23, 1969

3,485,593
EXHAUST TREATING DEVICE
Denis L. Lenane, Ferndale, and Raymond G. Lyben, Detroit, Mich., assignors to Ethyl Corporation, New York, N.Y., a corporation of Virginia
Filed June 9, 1967, Ser. No. 645,021
Int. Cl. B01j 9/00
U.S. Cl. 23—288                              17 Claims

ABSTRACT OF THE DISCLOSURE

In an exhaust system for internal combustion engines, the combination of a louvered conduit agglomeration unit followed by a cyclone separator removes particulates from exhaust gas. The low particulate exhaust gas can then be passed through a catalytic muffler. A preferred catalyst is an alumina impregnated with copper oxide and palladium.

BACKGROUND

The exhaust gas of internal combustion engines contains varying amounts of carbon monoxide, unburned hydrocarbons, nitrogen oxides, particulates, and other minor constituents. It is desirable that these materials in exhaust gas be minimized because some of them are reported to contribute to air pollution. Much work has been done in an effort to eliminate these constituents of exhaust gas. This has included carburetor modifications resulting in improved combustion efficiency, air injection into the exhaust manifold, recycle of crankcase vent gas, direct flame oxidation of exhaust gas, and the use of cyclone separators and filters for removing particulate matter from exhaust gas. Of these various methods, promising results have been obtained in reducing hydrocarbon and carbon monoxide in exhaust gas by contacting the exhaust gas with a catalyst contained in a so-called catalytic muffler. The life of such catalysts is limited by several factors, one of which is that the catalyst bed tends to become plugged or deactivated by the particulate matter contained in exhaust gas. This results in an increase in back pressure in the exhaust system and decreased catalytic activity.

SUMMARY

An object of this invention is to provide a means for removing particulate matter from the exhaust gas of internal combustion engines. A further object is to provide a means of removing particulates from the exhaust gas and also reducing the unburned hydrocarbon and carbon monoxide constituents of exhaust gas.

These and other objects are accomplished by providing an exhaust system which first passes the exhaust gas through a louvered agglomeration unit wherein particles accumulate and increase in size. The exhaust gas passes from the agglomeration unit to a cyclone separator carrying with it the agglomerated particles which accumulated in the agglomeration unit. Cyclone separators are well known and have in fact been used in exhaust systems to remove particulates. However, their efficiency in this use has been limited because of the extremely fine particle size of the solid material in the exhaust gas of internal combustion engines. The present combination of the agglomeration unit with a cylone separator results in a great increase in the efficiency of particulate removal. After the particulates have been removed or substantially reduced the exhaust gas can be exhausted to the atmosphere if it is satisfactory in other respects. However, it is frequently desirable, and hence another object of this invention, to reduce the unburned hydrocarbon and carbon monoxide content of the low particulate exhaust gas by subsequently contacting it together with oxygen with an exhaust gas oxidation catalyst. In the past, the efficiency of such catalytic oxidation is reported to have been reduced by the particulate content of exhaust gas, especially the particulates formed from the combustion of a fuel containing a tetraalkyllead antiknock. The combination of the agglomeration unit, a cyclone separator and a catalytic muffler provides a means of not only removing particulates from exhaust gas but also extending the useful life of an oxidation catalyst.

The invention is best understood by reference to the accompanying drawings of a preferred embodiment of the invention.

DESCRIPTION OF THE PREFERRED EMBODIMENTS

Figure 1:
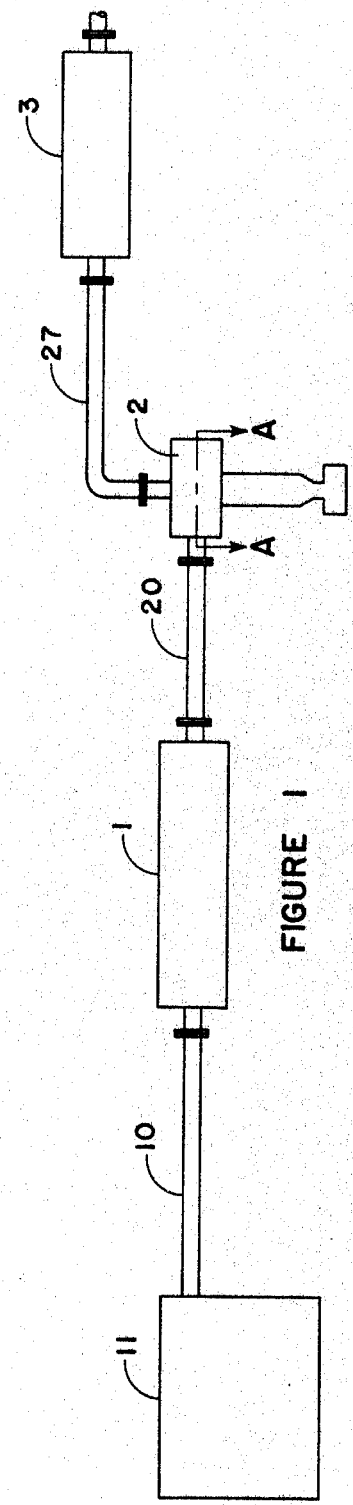
FIGURE 1 is a side elevation showing the agglomeration unit, cyclone separator and catalytic muffler installed in the exhaust system of an internal combustion engine.
Figure 2:
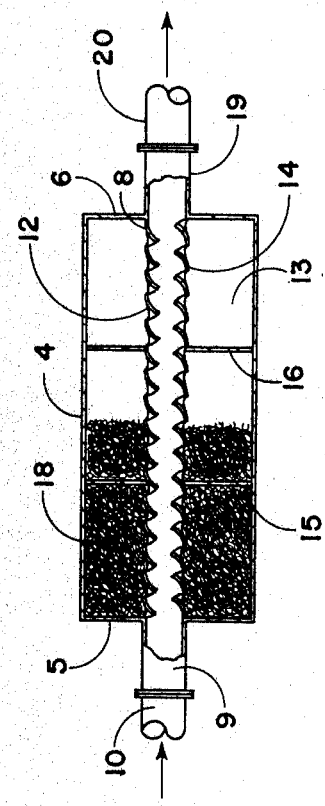
FIGURE 2 is a longitudinal cross-section of the agglomeration unit showing the louvered conduit passing through the body of the unit and a wire mesh agglomeration aid in the annular compartments.
Figure 3:
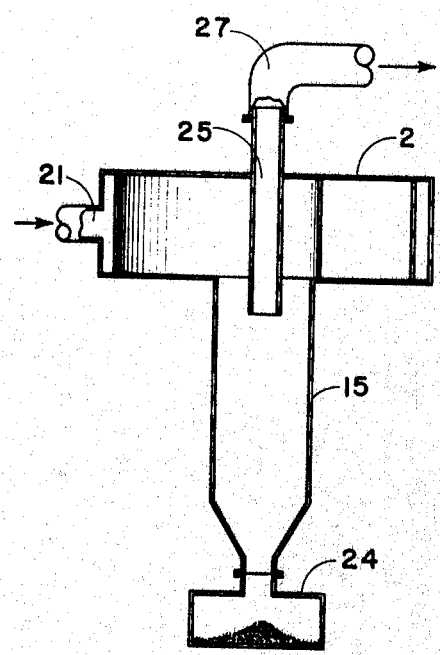
FIGURE 3 is a cross-section of the cyclone separator through the axis of the cyclone.
Figure 4:
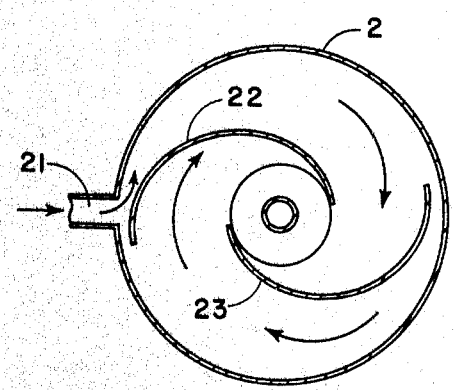
FIGURE 4 is a cross-section of the cyclone separator at A—A transverse to the axis of the cyclone showing the rotational chamber with deflection vanes.
Figure 5:
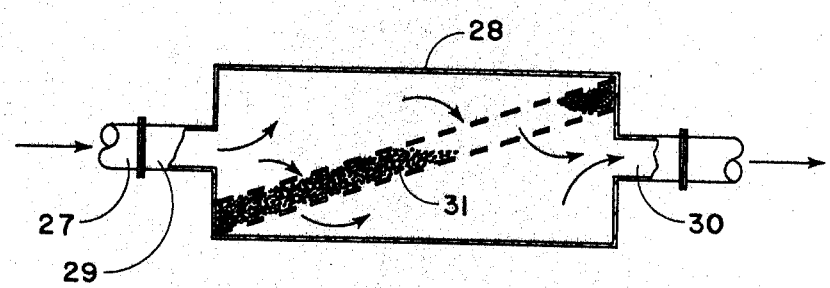
FIGURE 5 is a longitudinal cross-section of the catalytic muffler showing the muffler body, entry port, catalyst bed, and exit port.

In the preferred embodiments shown in FIGURES 1–5, the device comprises an agglomeration unit 1, a cyclone separator 2 and a catalytic muffler 3. The agglomeration unit 1 comprises a body 4 with end closures 5 and 6. Extending through body 4 and end closures 5 and 6 is louvered conduit 8. Inlet end 9 of louvered conduit 8 engages the exhaust pipe 10 of internal combustion engine 11. Louvered conduit 8 has rows of louvers along opposing surfaces cut substantially transverse to the axis of the conduit and inclined in opposite directions such that one row of louvers 12 serves to scoop the exhaust gas out of conduit 8 and into substantially annular space 13. The opposing row of louvers 14, oppositely inclined, tend to aspirate the exhaust gas back into conduit 8. Annular space 13 is preferably divided into substantially annular compartments by baffle plates 15 and 16. In order to improve agglomeration efficiency an agglomeration aid such as wire mesh 18 is generally placed in the annular compartments.

The outlet 19 of conduit 8 engages exhaust conduit 20, which functions to carry the exhaust gas to the inlet 21 of cyclone separator 2. In the embodiment shown in the drawing, the exhaust gas is urged into cyclonic rotation by deflection vanes 22 and 23. Many cyclone separators are available which do not employ deflection vanes, but merely introduce the gas tangentially and obtain satisfactory results. These are also suitable. The agglomerated particles in the exhaust gas are inertially separated in the cyclone separator and drop into collection chamber 24.

The low particulate exhaust gas then exits the cyclone separator through exit tube 25 and is conducted by conduit 27 to catalytic muffler 3. Various types of catalytic mufflers are known. The simple embodiment shown in FIGURE 5 comprises a muffler body 28 having an entry port 29 and an exit port 30. In passing from entry port 29 to exit port 30 the low particulate exhaust gas contacts catalyst bed 31. In order to improve efficiency, it is often beneficial to add supplemental air prior to contacting the exhaust gas with the catalyst. This is readily accomplished by a venturi located upstream from the catalytic muffler. Another method is to use a mechanical air pump which injects air into the exhaust stream ahead of the catalytic muffler.

Suitable catalysts include metals or metal oxides such as vanadium, chromium, manganese, iron, cobalt, nickel, copper, molybdenum, palladium, platinum, titanium and tin, metals or metal oxides, or mixtures of these metals or metal oxides. In order to improve their efficiency, they are generally impregnated on a high surface area support such as alumina, aluminum silicate, silica alumina, alkali metal aluminum silicates, aluminum gels, magnesium gels, thoria, magnesia or zirconia. An extremely useful catalyst is made by impregnating one of the above supports with a copper compound decomposable to an oxide form and with a palladium promoter. When using a palladium-promoted copper oxide catalyst it is preferred that the catalyst consist essentially of one of the above high specific surface area supports impregnated with from about 0.5 to 25 weight percent copper in an oxide form and from about 0.001 to 3 weight percent palladium. In most cases, very efficient results are obtained using an activated alumina support impregnated with from 0.5 to 10 weight percent copper in an oxide form and from about 0.01 to 0.3 weight percent palladium.

Methods of preparing the foregoing oxidation catalysts are well known in the art. For example, an alumina can be readily impregnated with copper nitrate by merely immersing the alumina in a copper nitrate solution. Heating the impregnated alumina to about 500° C. readily converts the copper nitrate to an oxide form of copper. This copper oxide impregnated alumina is then immersed in a solution of palladium chloride, following which it is again calcined to about 700–800° C., driving off water and resulting in an activated alumina containing copper in an oxide form and promoted with palladium. Various methods of preparing such catalysts are shown in U.S. 3,224,981.

In operation, the exhaust gas from internal combustion engine 11 is conducted to agglomeration unit 1 by exhaust pipe 10. It passes by exit louvers 12 into annular space 13. The annular space is generally divided into compartments by baffle plates. Although it is not necessary, the efficiency of the agglomeration is increased by the use of an agglomeration aid in the annular space. Suitable agglomeration aids include a variety of materials on which the particulate matter in the exhaust can impinge and subsequently grow to larger particle size. This particle growth is due to various factors including collision between smaller particles, and also condensation on small particles of normally solid matter which enters the agglomeration unit in the form of a vapor. Among these normally solid materials are the lead halide products formed by the combustion of a fuel containing a tetraalkyl-lead antiknock and an organo halogen scavenger. Preferred agglomeration aids include such materials as marble chips, silicon carbide, iron nails, synthetic or natural zeolites, wire mesh, and the like. The more preferred agglomeration aids are wire mesh and nails. These aids can be made from a variety of metallic materials such as iron, copper, stainless steel, aluminum, and the like. The most preferred agglomeration aid is wire mesh. Preferably the wire should have a diameter of from about 0.005 to about 0.2 inch and should be entangled and uniformly compacted to a density of from about 5–20 pounds per cubic foot. Suitable wire mesh may be obtained commercially because it is used in chemical distillation operations. One such wire mesh found to be very effective in agglomerating particulate matter from the exhaust gas of an internal combustion engine operated on fuel containing tetraethyllead and a halogen scavenger is a 0.011 diameter wire mesh made from stainless steel and uniformly entangled and compacted to a density of 12 pounds per cubic foot.

The agglomeration unit functions by itself to substantially reduce the particulate content of exhaust gas by entrapping the particulate matter, but its efficiency is greatly increased, especially in periods of extended use, by employing the unit in combination with a cyclone separator. As the particles grow in size in the agglomeration unit they tend to break loose, especially during wide open throttle operation of the engine. They are then swept by the exhaust stream back into conduit 8 through louvers 14. The exhaust gas carries the particulates through exhaust conduit 20 to cyclone separator 2. The cyclone separator serves to remove the agglomerated particles and the low particulate exhaust gas is then carried by conduit 27 to catalytic muffler 3. In passing through the catalytic muffler, the unburned hydrocarbons and carbon monoxide contact the oxidation catalyst bed and are oxidized by oxygen present in the exhaust gas. The exhaust gas is then passed into the atmosphere. Modifications of the embodiment described can be made which are within the scope of this invention. For example, although the various units of the claimed combinations are shown individually in the drawings, they can, in order to conserve space, be constructed as one unit which will perform multiple functions. One such unit would combine the louvered agglomeration unit and the cyclone separator. Also, variations in the construction of the agglomeration unit can be made which still embody the louvered conduit. For example, multiple conduit units can be readily made with the conduits connected in parallel or series. This serves to give a longer effective louvered conduit path in a more compact unit. Other variations in the claimed combinations can be made which are within the scope of the following claims.

We claim:
1. A device for removing particulates from the exhaust gas of an internal combustion engine, said device comprising a louvered agglomeration unit and a cyclone separator, said agglomeration unit comprising a body having end closures, an exhaust gas conduit extending through said body and said end closures, said conduit having an exhaust gas inlet end and an exhaust gas outlet end, said inlet end adapted to engage the exhaust pipe of said internal combustion engine, said conduit having longitudinal rows of louvers substantially transverse to the axis of said conduit arranged along opposing surfaces of said conduit and inclined in opposite directions such that the row of louvers arranged along one surface deflects said exhaust gas passing through said conduit out of said conduit and into the substantially annular space outside said conduit and within said body and such that the row of louvers arranged along the opposing surface of said conduit aspirates said exhaust gas from said substantially annular space back into said conduit causing said exhaust gas to circulate within said substantially annular space, said exhaust gas outlet end engaging means for conducting said exhaust gas to the inlet of said cyclone separator wherein the agglomerated particles escaping from said louvered agglomeration unit are separated.

2. The device of claim 1 containing an agglomeration aid within said substantially annular space.

3. The device of claim 2 wherein said agglomeration aid is wire mesh.

4. The device of claim 2 wherein said agglomeration aid is a quantity of nails.

5. The device of claim 1 having at least one baffle plate within said substantially annular space disposed substantially transverse to the longitudinal axis of said body forming a plurality of substantially annular compartments.

6. The device of claim 5 wherein said plurality of substantially annular compartments contain an agglomeration aid.

7. The device of claim 6 wherein said agglomeration aid is wire mesh.

8. The device of claim 6 wherein said agglomeration aid is a quantity of nails.

9. In an exhaust system for an internal combustion engine, the combination of the particulate removing device of claim 1 and a catalytic muffler located downstream from said device of claim 1, means for conducting the low particulate exhaust gas from said device of claim 1 to said catalytic muffler, said catalytic muffler comprising a muffler body having an entry port and an exit port and a catalyst bed within said muffler body such that said low particulate exhaust gas contacts said catalyst bed in passing from said entry port to said exit port.

10. The combination of claim 9 wherein said catalyst bed consists essentially of a catalyst composition especially adapted to substantially oxidize the unburned hydrocarbon and carbon monoxide constituents of said exhaust gas, said composition consisting essentially of a high specific surface area support selected from the group consisting of alumina, aluminum silicates, alkali metal aluminum silicates, silica alumina, aluminum gels, magnesium gels, thoria, magnesia, and zirconia, impregnated with from 0.5 to 25 weight percent copper in an oxide form and from 0.001 to about 3 weight percent palladium.

11. The combination of claim 10 wherein said catalyst composition consists essentially of a major portion of activated alumina, from 0.5 to 10 weight percent copper in an oxide form and from 0.01 to about 0.3 weight percent palladium.

12. In an exhaust system for an internal combustion engine, the combination of the particulate removing device of claim 3 and a catalytic muffler located downstream from said device of claim 3, means for conducting the low particulate exhaust gas from said device of claim 3 to said catalytic muffler, said catalytic muffler comprising a muffler body having an entry port and an exit port and a catalyst bed within said muffler body such that said low particulate exhaust gas contacts said catalyst bed in passing from said entry port to said exit port.

13. The combination of claim 12 wherein said catalyst bed consists essentially of a catalyst composition especially adapted to substantially oxidize the unburned hydrocarbon and carbon monoxide constituents of said exhaust gas, said composition consisting essentially of a high specific surface area support selected from the group consisting of alumina, aluminum silicates, silica alumina, alkali metal aluminum silicates, aluminum gels, magnesium gels, thoria, magnesia, and zirconia, impregnated with from about 0.5 to 25 weight percent copper in an oxide form and from 0.001 to about 3 weight percent palladium.

14. In an exhaust system for an internal combustion engine, the combination of the particulate removing device of claim 7 and a catalytic muffler located downstream from said device of claim 7, means for conducting the low particulate exhaust gas from said device of claim 7 to said catalytic muffler, said catalytic muffler comprising a muffler body having an entry port and an exit port and a catalyst bed within said muffler body such that said low particulate exhaust gas contacts said catalyst bed in passing from said entry port to said exit port.

15. The combination of claim 14 wherein said catalyst bed consists essentially of a catalyst composition especially adapted to substantially oxidize the unburned hydrocarbon and carbon monoxide constituents of said exhaust gas, said composition consisting essentially of a high specific surface area support selected from the group consisting of alumina, aluminum silicates, silica alumina, alkali metal aluminum silicates, aluminum gels, magnesium gels, thoria, magnesia, and zirconia, impregnated with from about .05 to 25 weight percent copper in an oxide form and from 0.001 to about 3 weight percent palladium.

16. The combination of claim 15 wherein said catalyst bed consists essentially of a catalyst composition especially adapted to substantially oxidize the unburned hydrocarbon and carbon monoxide constituents of said exhaust gas, said composition consisting essentially of a high specific surface area support selected from the group consisting of alumina, aluminum silicates, alkali metal aluminum silicates, silica alumina, aluminum gels magnesium gels, thoria, magnesia, and zirconia, impregnated with from 0.5 to 10 weight percent copper in an oxide form and from 0.01 to about 0.3 weight percent palladium.

17. The combination of claim 16 wherein said catalyst composition consists essentially of a major portion of activated alumina, from about .05 to 10 weight percent copper in an oxide form and from about 0.01 to 0.3 weight percent palladium.

References Cited

UNITED STATES PATENTS

| | | |
|---|---|---|
| 2,288,943 | 7/1942 | Eastman. |
| 3,025,133 | 3/1962 | Robinson et al. |
| 3,056,662 | 10/1962 | Ridgway. |
| 3,100,146 | 8/1963 | Huntington. |
| 3,154,389 | 10/1964 | Hayes et al. |
| 3,224,981 | 12/1965 | Stephens et al. ____ 23—2.2 XR |
| 3,237,399 | 3/1966 | Hamblin et al. |
| 3,239,317 | 3/1966 | Rhodes. |
| 3,253,400 | 5/1966 | Hass. |
| 3,397,034 | 8/1968 | Tulleners et al. |
| 3,413,096 | 11/1968 | Britt. |

MORRIS O. WOLK, Primary Examiner

B. S. RICHMAN, Assistant Examiner

U.S. Cl. X.R.

23—2; 60—29

PO-1050
(5/69)

UNITED STATES PATENT OFFICE
CERTIFICATE OF CORRECTION

Patent No. 3,485,593                    Dated  December 23, 1969

Inventor(s)   Denis L. Lenane and Raymond G. Lyben

It is certified that error appears in the above-identified patent and that said Letters Patent are hereby corrected as shown below:

Column 6, Claim 15, line 13, ".05" should read -- 0.5 --;
Claim 17, line 29, ".05" should read -- 0.5 --.

SIGNED AND
SEALED

JUN 16 1970

(SEAL)
Attest:

Edward M. Fletcher, Jr.
Attesting Officer

WILLIAM E. SCHUYLER, JR.
Commissioner of Patents